United States Patent
Schmidt et al.

(10) Patent No.: US 8,284,523 B2
(45) Date of Patent: Oct. 9, 2012

(54) PIVOT ATTACH METHOD FOR DISK DRIVE ACTUATOR USING TAPER LOCK SHIMS

(75) Inventors: Ryan John Schmidt, Santa Barbara, CA (US); Philippe Jacques Parsy, Rancho Santa Margarita, CA (US); Damon Douglas Brink, Ventura, CA (US); David Django Dexter, Goleta, CA (US); Sven Gronemann, Goleta, CA (US)

(73) Assignee: Intri-Plex Technologies, Inc., Santa Barbara, CA (US)

( * ) Notice: Subject to any disclaimer, the term of this patent is extended or adjusted under 35 U.S.C. 154(b) by 82 days.

(21) Appl. No.: 13/025,095

(22) Filed: Feb. 10, 2011

(65) Prior Publication Data

US 2012/0206836 A1     Aug. 16, 2012

(51) Int. Cl.
*G11B 21/08* (2006.01)
(52) U.S. Cl. .................................................. 360/265.6
(58) Field of Classification Search ............... 360/265.6
See application file for complete search history.

(56) References Cited

U.S. PATENT DOCUMENTS

| | | | | |
|---|---|---|---|---|
| 5,446,608 A | * | 8/1995 | Sanada | 360/97.12 |
| 5,999,373 A | * | 12/1999 | Allsup et al. | 360/265.6 |
| 6,304,409 B1 | * | 10/2001 | Allsup | 360/77.03 |
| 6,519,116 B1 | * | 2/2003 | Lin et al. | 360/265.6 |
| 6,606,224 B2 | * | 8/2003 | Macpherson et al. | 360/265.6 |
| 6,634,103 B2 | * | 10/2003 | Muraki et al. | 29/898.07 |
| 2002/0118490 A1 | * | 8/2002 | Macpherson et al. | 360/265.6 |
| 2006/0181811 A1 | * | 8/2006 | Hanrahan et al. | 360/265.2 |
| 2009/0296282 A1 | * | 12/2009 | Hanrahan et al. | 360/265.6 |
| 2012/0087044 A1 | * | 4/2012 | Schmidt et al. | 360/265.6 |

\* cited by examiner

*Primary Examiner* — Mark Blouin

(57) ABSTRACT

Various methods and apparatus relating to disk drive actuators and methods of manufacturing them are disclosed and claimed. In certain embodiments, a disk drive actuator assembly comprises a pivot bearing defining a pivot bearing rotational axis; an actuator arm including a bore, the pivot bearing disposed at least partially within the bore; a first tapered shim, interposed in the bore between the pivot bearing and the actuator arm, the first tapered shim having a thickness at a first end greater than a thickness at a second end; and a second tapered shim, interposed in the bore between the pivot bearing and the actuator arm, the second tapered shim having a thickness at a third end greater than a thickness at a fourth end; wherein the second tapered shim frictionally engages the first tapered shim to hold the pivot bearing substantially in place relative to the actuator arm.

32 Claims, 7 Drawing Sheets

PIVOT ATTACH METHOD FOR DISK DRIVE ACTUATOR USING TAPER LOCK SHIMS

BACKGROUND OF THE INVENTION

1. Technical Field of the Invention

Implementations consistent with the principles of the invention generally relate to the field of disk drive technology, more specifically to disk drive actuator assemblies and methods of manufacturing thereof.

2. Background

Conventional disk drives comprise a mechanical housing which encloses one or more rigid discs that typically are rotated at a constant speed. A plurality of actuator arms is typically used to support heads that read data from and write data to concentric circular tracks on the discs. Existing disk drive actuator assemblies employ pivot bearings that extend upward from the mechanical housing to mount one or more disk drive actuator arms to permit the actuator arms to rotate about the pivot bearing to precisely place a particular head over a desired disc location to be read or written.

Existing disk drive actuators have used various methods to attach actuator arms to disk drive actuator pivot bearings. Exemplary methods have included press fitting, adhesive bonding, set screws, threaded pivot shafts and nuts, wavy washers, snap rings, and tolerance rings/interference bands.

However, each of these methods suffers from one or more of the following problems: high cost of components, high cost of assembly, poor reworkability, outgassing, component shifting from shock events, uneven radial loading resulting in uneven pivot friction and seek/settle issues, short distance between outermost axial contact points resulting in pivot rocking, pivot friction increase from radial loading, and/or low radial stiffness resulting in poor assembly dynamic performance.

Thus there is a need in the art for a cost effective means of holding a disk drive actuator arm in place with respect to a disk drive actuator pivot bearing, while addressing the above issues or other limitations in the art.

There is a need in the art for disk drive actuators that prevent shifting of a disk drive actuator arm with respect to a disk drive actuator pivot bearing due to shock events and provide improved radial stiffness to enhance performance of the disk drive actuator assembly. There further is a need for disk drive actuators that have reduced impacts on pivot friction. There also is a need for disk drive actuators with reduced sensitivity to changes in radial clearance between the actuator bore the pivot outside diameter due to size variation.

SUMMARY OF THE INVENTION

Various methods and apparatus relating to disk drive actuator assemblies and methods of manufacturing them are disclosed and claimed.

In certain embodiments, a disk drive actuator assembly comprises a pivot bearing defining a pivot bearing rotational axis; an actuator arm including a bore, the pivot bearing disposed at least partially within the bore; a first tapered shim, interposed in the bore between the pivot bearing and the actuator arm, the first tapered shim having a thickness at a first end greater than a thickness at a second end; and a second tapered shim, interposed in the bore between the pivot bearing and the actuator arm, the second tapered shim having a thickness at a third end greater than a thickness at a fourth end; wherein the second tapered shim frictionally engages the first tapered shim to hold the pivot bearing substantially in place relative to the actuator arm.

In certain embodiments, a method of fabricating a disk drive actuator assembly, comprises providing a pivot bearing defining a pivot bearing rotational axis; providing an actuator arm including a bore; disposing at least a portion of the pivot bearing within the bore; inserting at least a portion of a first tapered shim into the bore between the pivot bearing and the actuator arm, the first tapered shim having a thickness at a first end greater than a thickness at a second end; and inserting at least a portion of a second tapered shim into the bore between the pivot bearing and the actuator arm, the second tapered shim having a thickness at a third end greater than a thickness at a fourth end, such that the second tapered shim frictionally engages the first tapered shim to hold the pivot bearing substantially in place relative to the actuator arm.

Other aspects and advantages of the present invention may be seen upon review of the figures, the detailed description, and the claims that follow.

BRIEF DESCRIPTION OF THE DRAWINGS

Some embodiments of the invention are described with reference to the following figures.

DETAILED DESCRIPTION

Certain embodiments of the invention relate to the design of disk drive actuators and methods for their assembly.

Figure 1:
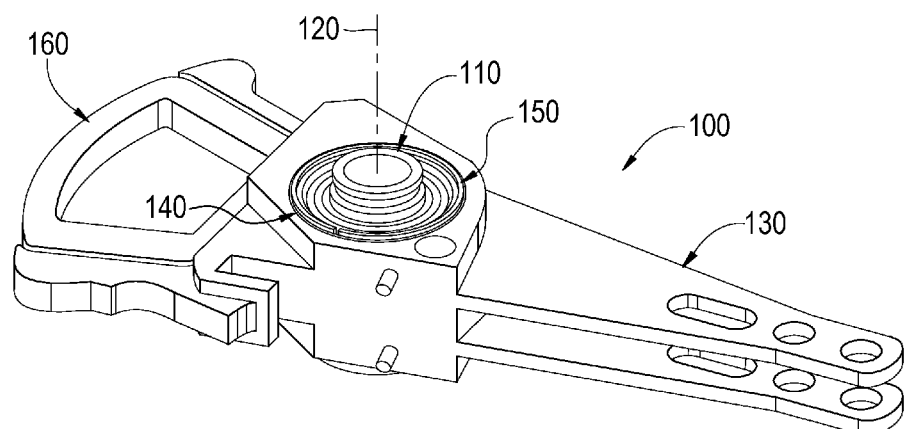
FIG. 1 is a perspective view of a disk drive actuator assembly according to certain embodiments of the invention.

FIG. 1 displays a disk drive actuator assembly 100 in accordance with certain embodiments of the invention. The disk drive actuator may comprise a pivot bearing 110, which defines a pivot bearing rotational axis 120. The pivot bearing 110 may be disposed within a bore of an actuator arm 130. A first tapered shim 140 and a second tapered shim 150 may be pressed in place between the outer diameter of the pivot bearing 110 and the inner diameter of the bore of the actuator arm 130 to hold the actuator arm 130 in place relative to the pivot bearing 110. First tapered shim 140 and second tapered shim 150 may hold the actuator arm 130 in place relative to the pivot bearing 110 through friction forces created through substantially uniform radial loading. The disk drive actuator may also comprise a coil 160.

Figure 2:
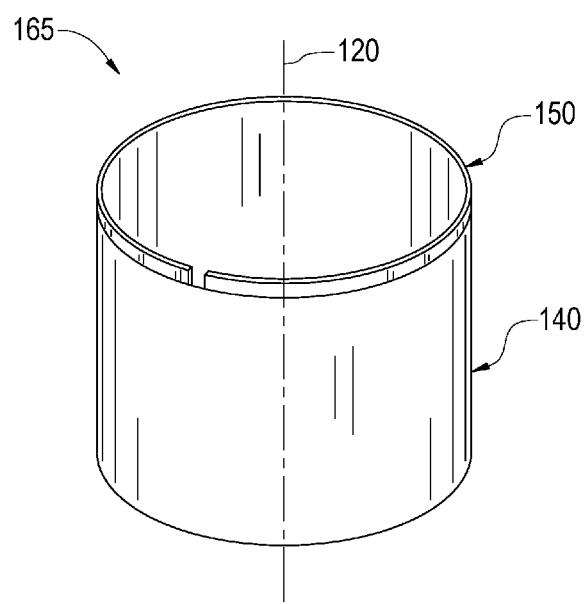
FIG. 2 is a perspective view of two interlocked tapered shims according to certain embodiments of the invention.

FIG. 2 provides a separate view of first tapered shim 140 and second tapered shim 150. One of ordinary skill in the art will understand that in each of the embodiments disclosed herein, the first tapered shim 140 and a second tapered shim 150 may be preassembled as shown in FIG. 2 to form a shim assembly 165 before being inserted into the disk drive assembly. In any embodiment in which the first tapered shim 140 and a second tapered shim 150 are described as being inserted separately or sequentially, they may instead be preassembled as a shim assembly 165 and the shim assembly 165 may be inserted as a single unit.

Figure 3:
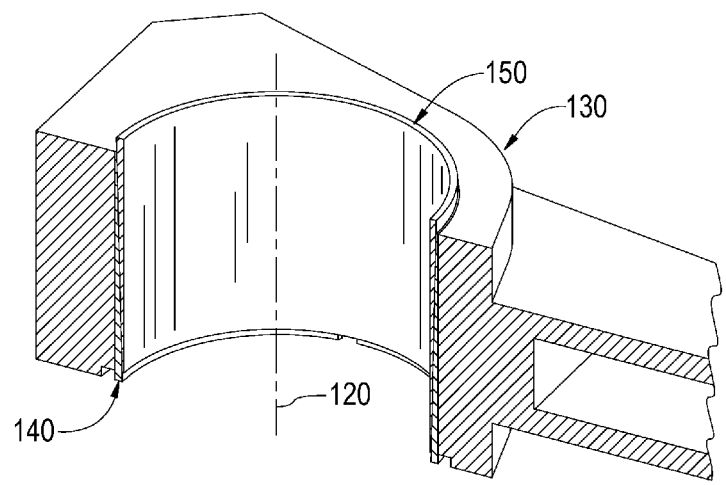
FIG. 3 is a cross-sectional view of two interlocked tapered shims disposed at least partially within a bore of an actuator arm according to certain embodiments of the invention.

FIG. 3 shows a cutaway view of the actuator arm with first tapered shim 140 and second tapered shim 150 within the bore of actuator arm 130.

In certain embodiments, first tapered shim 140 is tapered in an axial direction corresponding substantially with the pivot bearing rotational axis 120. The first tapered shim 140 may have a thickness at a first end greater than a thickness at a second end. The second tapered shim 150 also may be tapered in an axial direction corresponding substantially with the pivot bearing rotational axis 120. The second tapered shim 150 may have a thickness at a third end greater than a thickness at a fourth end. The first end may be positioned below the second end when the first tapered shim 140 is interposed in the bore between the pivot bearing 110 and the actuator arm 130. The third end may be positioned above the fourth end when the second tapered shim is interposed in the bore between the pivot bearing 110 and the actuator arm 130.

In certain embodiments, the thickness of the first end may be in the range of about 230 microns to about 900 microns. In certain embodiments, the thickness at the second end may be in the range of about 25 microns to about 180 microns. In certain embodiments, the thickness of the third end may be in the range of about 230 microns to about 900 microns. In certain embodiments, the thickness at the fourth end may be in the range of about 25 to about 180 microns. The thickness of first tapered shim 140 may vary substantially linearly from the first end to the second end. The thickness of second tapered shim 150 may vary substantially linearly from the third end to the fourth end.

In certain embodiments, the first end may be a lower axial extent of first tapered shim 140. The second end may be an upper axial extent of the first tapered shim 140. In certain embodiments, the third end may be an upper axial extent of the second tapered shim 150. The fourth end may be a lower axial extent of second tapered shim 150.

Figure 4:
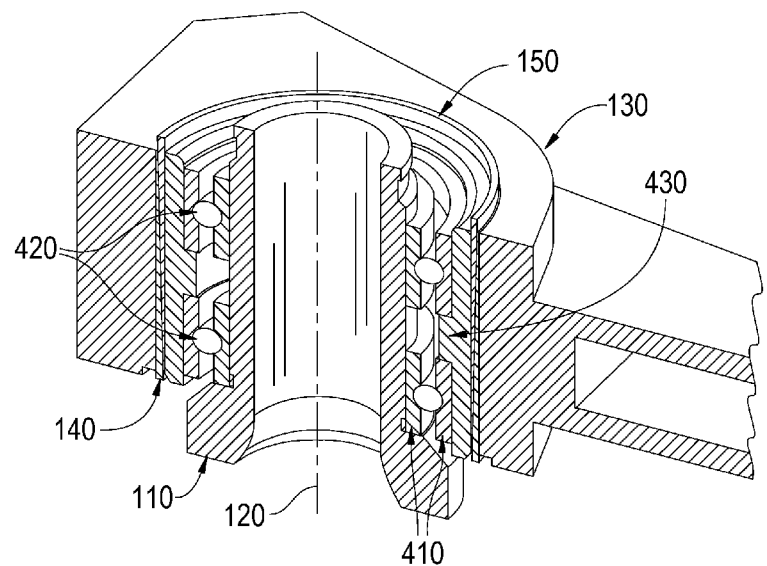
FIG. 4 is a perspective, cross-sectional view of a pivot bearing disposed at least partially within the bore of the actuator arm of FIG. 3 according to certain embodiments of the invention.

FIG. 4 shows a cutaway view with pivot bearing 110 disposed at least partially within the bore of actuator 130 and first tapered shim 140 and second tapered shim 150 interposed between pivot bearing 110 and actuator arm 130. One of skill in the art will recognize that first tapered shim 140 may be placed between second tapered shim 150 and actuator arm 130, as shown in FIGS. 1-4, or alternately may be placed between second tapered shim 150 and pivot bearing 110. FIG. 4 shows additional detail of an embodiment wherein pivot bearing 110 comprises bearing races 410, bearings 420, and pivot bearing sleeve 430.

In certain embodiments, the first tapered shim 140 and/or the second tapered shim 150 may be substantially cylindrical. For the purposes of this application, substantially cylindrical includes any shape that has at least one surface that is substantially symmetrical about pivot bearing rotational axis 120, including but not limited to shapes that comprise a split that forms a gap in the circumference of the shape. The first tapered shim and the second tapered shim thus need not be continuous around their entire circumference to be considered substantially cylindrical. In certain embodiments, the first tapered shim 140 and/or the second tapered shim 150 may be substantially right circular cylinders. The first tapered shim 140 may be split to form a gap between a first edge that is substantially parallel to the pivot bearing rotational axis and a second edge that is substantially parallel to the pivot bearing rotational axis. The second tapered shim may be split to form a gap between a third edge that is substantially parallel to the pivot bearing rotational axis and a fourth edge that is substantially parallel to the pivot bearing rotational axis. In certain embodiments, first tapered shim 140 may be formed from a first tapered sheet. In certain embodiments, second tapered shim 150 may be formed from a second tapered sheet.

Figure 5:
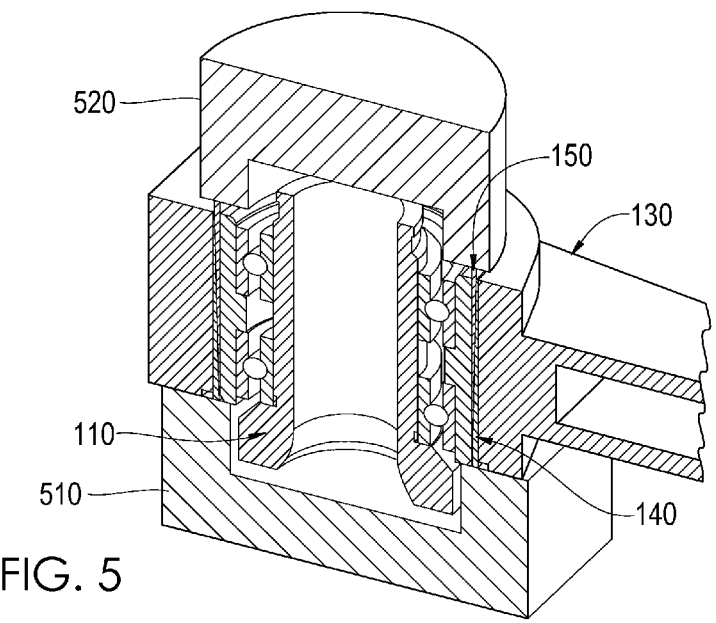
FIG. 5 is a cross-sectional view of an apparatus for fabricating a disk drive actuator assembly, according to certain embodiments of the invention.
Figure 6:
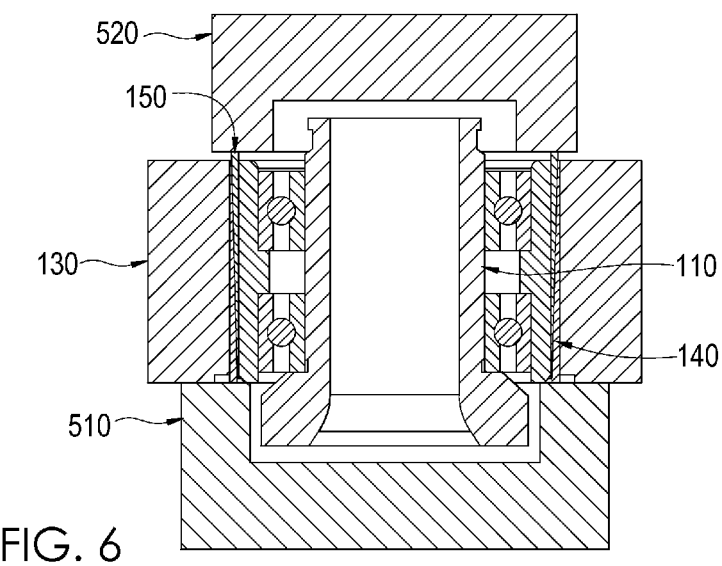
FIG. 6 is a cross-sectional view of an apparatus for fabricating a disk drive actuator assembly according to certain embodiments of the invention.

FIGS. 5 and 6 show an apparatus for assembling a disk drive actuator assembly. In certain embodiments, a disk drive actuator assembly can be assembled by placing an actuator arm 130 on support tooling 510 and disposing at least a portion of pivot bearing 110 within a bore of actuator arm 130. At least a portion of a first tapered shim 140 may be inserted into the bore between pivot bearing 110 and actuator arm 130. At least a portion of a second tapered shim 150 may be inserted into the bore between pivot bearing 110 and actuator arm 130 such that the second tapered shim 150 frictionally engages first tapered shim 140 to hold the pivot bearing 110 substantially in place relative to actuator arm 130. The second tapered shim 150 may be inserted by applying force to second tapered shim 150 with push tooling 520.

Alternately, a disk drive actuator assembly can be assembled by placing an actuator arm 130 on support tooling 510 and disposing at least a portion of pivot bearing 110 within a bore of actuator arm 130. At least a portion of a first tapered shim 140 may be inserted into the bore between pivot bearing 110 and actuator arm 130. At least a portion of a shim assembly 165 may be inserted into the bore between pivot bearing 110 and actuator arm 130 such that the second tapered shim 150 frictionally engages first tapered shim 140 to hold the pivot bearing 110 substantially in place relative to actuator arm 130. The second tapered shim 150 may further be inserted by applying force to second tapered shim 150 with push tooling 520.

In certain embodiments, Equations 1 and 2 below reflect the forces applied during assembly of a disk drive actuator.

$$F_{aa} = F_p = F_s \quad \text{Equation 1}$$

where $F_{aa}$ is the force against the bore of the actuator arm from the first tapered shim; $F_p$ is the force against the pivot bearing by the second tapered shim; and $F_s$ is the horizontal force from the first tapered shim on the second tapered shim.

$$F_a = F_p(\mu_{ss}(\cos \alpha)^2 - \mu_{sp}) \quad \text{Equation 2}$$

where $F_a$ is the final assembly force applied to pushing tool 520 in a direction substantially parallel to pivot bearing rotational axis 120; $F_p$ is the force against the pivot bearing by the second tapered shim; $\mu_{ss}$ is the coefficient of friction between the first tapered shim and the second tapered shim; $\alpha$ is the taper angle of first tapered shim and the second tapered shim; and $\mu_{sp}$ is the coefficient of friction between the second tapered shim and the pivot bearing. The following table provides an exemplary assembly configuration:

| | |
|---|---|
| Carried Mass (kg) | 0.0055 |
| Shock (g's) | 550 |
| Safety Factor | 3 |
| Minimum Slip Force (N) | 89 |
| $\mu_{ss}$ | 0.42 |
| $\mu_{sp}$ | 0.42 |
| $F_p$ (N) | 212 |
| $F_s$ (N) | 212 |
| $F_a$ (N) | 178.1 |

In certain embodiments, contact is nearly complete between overlapping portions of (1) the first tapered shim and the inner diameter of the actuator arm, (2) the second tapered shim and the outer surface of the pivot bearing, and (3) the first tapered shim and the second tapered shim. The disk drive actuator assembly may exhibit improved radial stiffness compared to conventional assemblies due to the high compressive stiffness of the shim assembly. The variation of pivot friction due to variation in radial clearance between the actuator bore and the pivot outside diameter due to size variations may advantageously be reduced in certain embodiments. Certain embodiments may also reduce variation of pivot friction due to pivot distortion and variation of final pivot height.

Figure 7A:
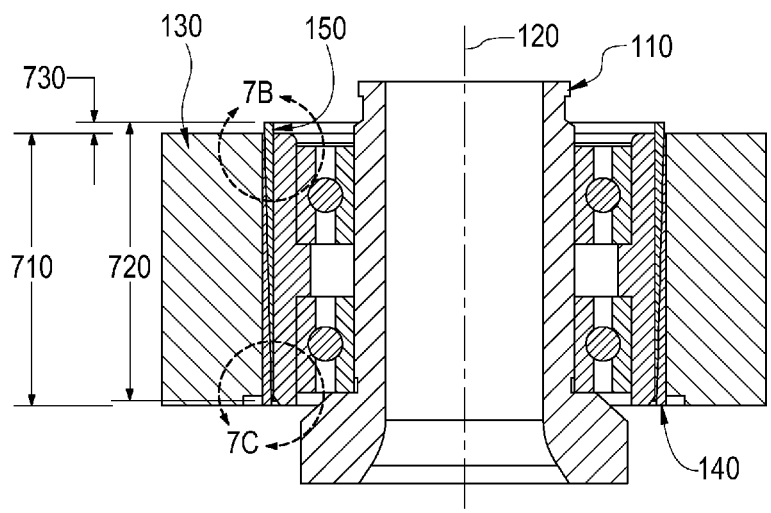
FIGS. 7A-7C are cross-sectional and close-up sectional views of a disk drive actuator assembly according to certain embodiments of the invention.
Figure 7B:
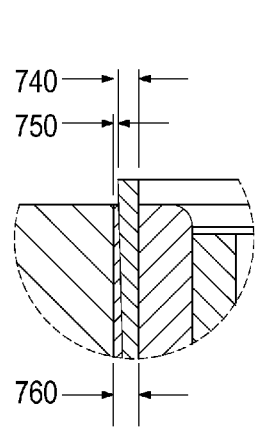
Figure 7C:
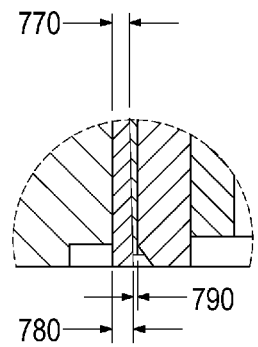

FIGS. 7A-7C show certain geometric relationships of certain embodiments of the invention. In certain embodiments, the height 710 of first tapered shim 140 may be substantially equal to the height of actuator arm 130.

As shown in Equation 3, $$H_{sts} = H_{aa} + H_e \quad \text{Equation 3}$$

the height 720 of second tapered shim 150 ($H_{sts}$) may be expressed as the sum of the height of actuator arm 130 ($H_{aa}$) and the extra height of second tapered shim 150. Extra height $H_e$ may represent the extra shim height required to ensure contact of the push tool 520 with the second tapered shim 150 when the gap between the actuator arm 130 and the pivot bearing 110 is at its largest due to variation of component sizes. The protrusion of the second tapered shim 730 may be equal to the extra height $H_e$ of second tapered shim 150 at the maximum gap.

In certain embodiments, the height of protrusion of the second tapered shim is expressed in Equation 4, $$H_p = H_e + (G_a - G_n + G_t)/2/\tan\alpha \quad \text{Equation 4}$$

where $H_p$ is the height of protrusion 730 of the second tapered shim 150 over actuator arm 130; $H_e$ is the extra height of second tapered shim 150; $G_a$ is the actual gap between the pivot bearing and the actuator arm; $G_n$ is the nominal gap between the inner diameter of the bore of actuator arm 130 and the outer diameter of pivot bearing 110; $G_t$ is the pivot bearing outer diameter to actuator arm inner diameter tolerance; and $\alpha$ is the taper angle of the first tapered shim.

FIG. 7B shows detail of section 7B from FIG. 7A.

In certain embodiments, the maximum height of the assembled shims is reflected in Equation 5, $$H_{asmax} = H_{aa} + H_e + H_t \quad \text{Equation 5}$$

Where $H_{asmax}$ is the maximum height of the assembled shims; $H_{aa}$ is the height of the actuator arm; $H_e$ is the extra height 730 of second tapered shim 150; and $H_t$ is the travel height of the second tapered shim 150 over the minimum to maximum gap. In certain embodiments, the minimum height of the assembled shims ($H_{asmin}$) is reflected in Equation 6, $$H_{asmin} = H_{aa} + H_e \quad \text{Equation 6}$$

FIG. 7C shows detail of section 7C from FIG. 7A. In certain embodiments, taper angle 770 ($\alpha$) of first tapered shim 140 may be expressed by Equation 7, $$\alpha = \arctan((T_{1e} + T_{2e})/H_{fts}) \quad \text{Equation 7}$$

where $\alpha$ is the taper angle 770 of first tapered shim 140; $T_{1e}$ is the thickness 780 of the first end of the first tapered shim 140; $T_{2e}$ is the thickness 750 of the second end of the first tapered shim 140; and $H_{fts}$ is the height 720 of first tapered shim 140. In certain embodiments, the thickness 790 of the fourth end of second tapered shim 150 may be less than the thickness 740 of the third end of second tapered shim 150.

In certain embodiments, Equation 8 describes the travel height of the second tapered shim.

$$H_t = G_t/\tan\alpha \quad \text{Equation 8}$$

Where $H_t$ is the travel height of the second tapered shim over the minimum to maximum gap; $G_t$ is the pivot bearing outer diameter to actuator arm inner diameter tolerance; and $\alpha$ is the taper angle 770 of first tapered shim 140.

In certain embodiments, the second tapered shim may have a taper angle substantially equal to the taper angle ($\alpha$) of the first tapered shim. In such embodiments the thickness of the third end may be related to the thickness of the fourth end as expressed by Equation 9, $$T_{3e} = (Haa + He + Ht)\tan\alpha + T_{4e} \quad \text{Equation 9}$$

where $\alpha$ is the taper angle of the second tapered shim 150; $T_{3e}$ is the thickness 740 of the third end of second tapered shim 150; $T_{4e}$ is the thickness 790 of the fourth end of second tapered shim 150; $H_{aa}$ is the height of actuator arm 130; $H_e$ is the extra height 730 of second tapered shim 150; and $H_t$ is the travel height of the second tapered shim 150 over the minimum to maximum gap.

Figure 8:
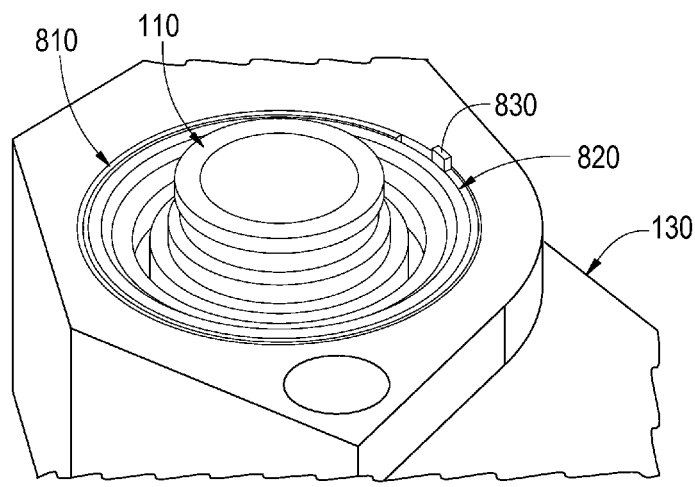
FIG. 8 is a perspective view of a disk drive actuator assembly with circumferentially tapered interlocking shims according to certain embodiments of the invention.
Figure 9:
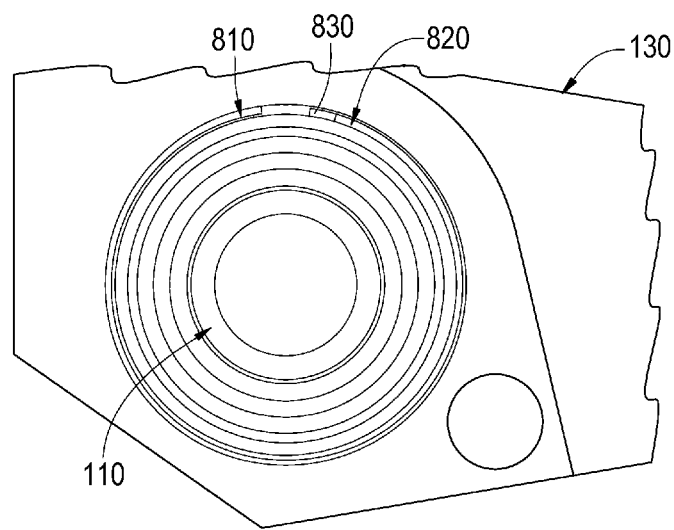
FIG. 9 is a top view of the disk drive actuator assembly of FIG. 8 according to an embodiment of the invention.
Figure 10:
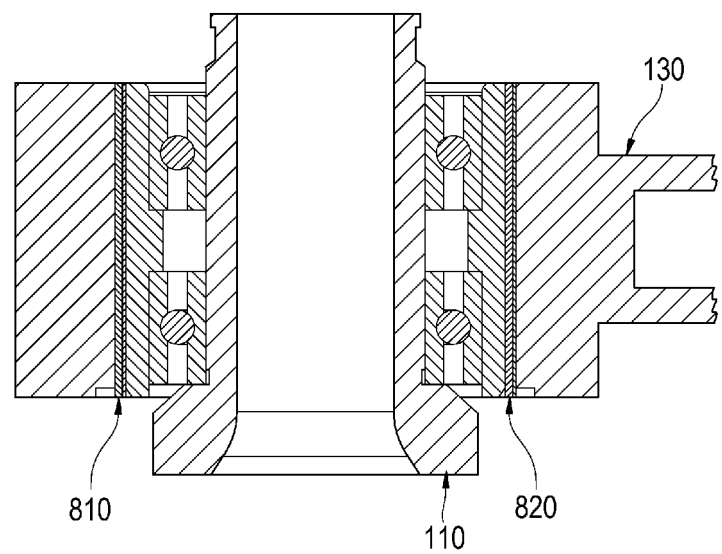
FIG. 10 is a cross-sectional view of the disk drive actuator assembly of FIG. 8 according to certain embodiments of the invention.

In certain embodiments, as shown in FIGS. 8-10, pivot bearing 110 may be disposed at least partially within the bore of actuator 130 and first tapered shim 810 and second tapered shim 820 may be interposed between pivot bearing 110 and actuator arm 130. One of skill in the art will recognize that first tapered shim 810 may be placed between second tapered shim 820 and actuator arm 130, as shown in FIGS. 8-10, or alternately may be placed between second tapered shim 820 and pivot bearing 110.

In certain embodiments, the first tapered shim 810 and/or the second tapered shim 820 may be substantially cylindrical. For the purposes of this application, substantially cylindrical includes any shape that has at least one surface that is substantially symmetrical about pivot bearing rotational axis 120, including but not limited to shapes that comprise a split that forms a gap in the circumference of the shape. The first tapered shim and the second tapered shim thus need not be continuous around their entire circumference to be considered substantially cylindrical. In certain embodiments, the first tapered shim 810 and/or the second tapered shim 820 may be substantially right circular cylinders. The first tapered shim 810 may be split to form a gap between a first edge that is substantially parallel to pivot bearing rotational axis 120 and a second edge that is substantially parallel to pivot bearing rotational axis 120. The second tapered shim may be split to form a gap between a third edge that is substantially parallel to pivot bearing rotational axis 120 and a fourth edge that is substantially parallel to pivot bearing rotational axis 120. In certain embodiments, a first tapered sheet may be formed into a substantially cylindrical shape to form first tapered shim 810. In certain embodiments, a second tapered sheet may be formed into a substantially cylindrical shape to form second tapered shim 820.

In certain embodiments, first tapered shim 810 may be tapered in a first circumferential direction with respect to pivot bearing rotational axis 120. The first tapered shim 810 may have a thickness at a first end greater than a thickness at a second end. The first end may comprise a first circumferential extent which may include the first edge. The second end may comprise a second circumferential extent which may include the second edge. In certain embodiments, the second tapered shim 820 may be tapered in a second circumferential direction with respect to pivot bearing rotational axis 120. In certain embodiments, the first circumferential direction may be substantially opposite the second circumferential direction. The second tapered shim 820 may have a thickness at a third end greater than a thickness at a fourth end. The third end may comprise a third circumferential extent which may include the third edge. The fourth end may comprise a fourth circumferential extent which may include the fourth edge. The thickness of first tapered shim 810 may vary substantially linearly from the first end to the second end. The thickness of second tapered shim 820 may vary substantially linearly from the third end to the fourth end. In certain embodiments, the thickness of the first end may be in the range of about 230 microns to about 900 microns. In certain embodiments, the thickness at the second end may be in the range of about 25 microns to about 180 microns. In certain embodiments, the thickness of the third end may be in the range of about 230 microns to about 900 microns. In certain embodiments, the thickness at the fourth end may be in the range of about 25 microns to about 180 microns.

In certain embodiments, the first tapered shim may comprise a first inner surface in frictional contact with at least a portion of the pivot bearing and a first outer surface defining a first taper angle with respect to the first inner surface, wherein the first outer surface is in frictional contact with at least a portion of the second tapered shim. In certain embodiments, the second tapered shim may comprise a second outer surface in frictional contact with at least a portion of the bore and a second inner surface defining a second taper angle with respect to the second outer surface, wherein the second inner surface is in frictional contact with at least a portion of the first outer surface of the first tapered shim. In certain embodiments, the first outer surface and the second inner surface may be substantially smooth. In other embodiment, at least one of the first outer surface and the second inner surface may comprise at least one raised portion, or dimple, to accommodate for imperfections in the first outer surface and the second inner surface and to facilitate frictional engagement between the first tapered shim and the second tapered shim. One of ordinary skill in the art will recognize that other conventional methods of accommodating manufacturing tolerances and ensuring proper frictional engagement, such as roughening the material surface by bead blasting or by using a rougher roller surface during raw material manufacturing, without departing from the scope of the present invention.

In certain embodiments, a disk drive actuator assembly can be assembled by providing an actuator arm 130 and disposing at least a portion of pivot bearing 110 within a bore of actuator arm 130. At least a portion of a first tapered shim 810 may be inserted into the bore between pivot bearing 110 and actuator arm 130. At least a portion of a second tapered shim 820 may be inserted into the bore between pivot bearing 110 and actuator arm 130 such that the second tapered shim 820 frictionally engages first tapered shim 810 to hold the pivot bearing 110 substantially in place relative to actuator arm 130. The second tapered shim 820 may be inserted by applying a substantially tangential force to second tapered shim 820 to frictionally engage first tapered shim 810. In certain embodiments, second tapered shim 820 may comprise a raised tab 830 for applying the substantially tangential force.

Alternately, in certain embodiments, a disk drive actuator assembly can be assembled by providing an actuator arm 130 and disposing at least a portion of pivot bearing 110 within a bore of actuator arm 130. At least a portion of a shim assembly comprising first tapered shim 810 and a second tapered shim 820 may be inserted into the bore between pivot bearing 110 and actuator arm 130 such that the second tapered shim 820 frictionally engages first tapered shim 810 to hold the pivot bearing 110 substantially in place relative to actuator arm 130. The second tapered shim 820 further may be inserted by applying a substantially tangential force to second tapered shim 820 to frictionally engage first tapered shim 810. In certain embodiments, second tapered shim 820 may comprise a raised tab 830 for applying the substantially tangential force.

Figure 11:
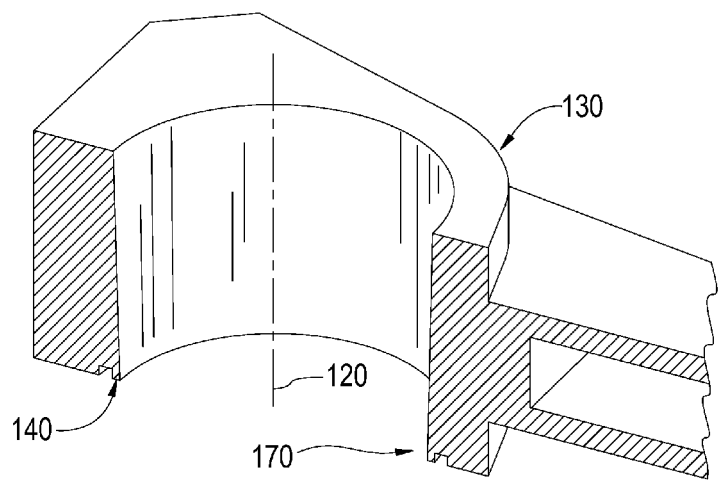
FIG. 11 is a cross-sectional view of an actuator arm with a tapered actuator bore according to certain embodiments of the invention.
Figure 12:
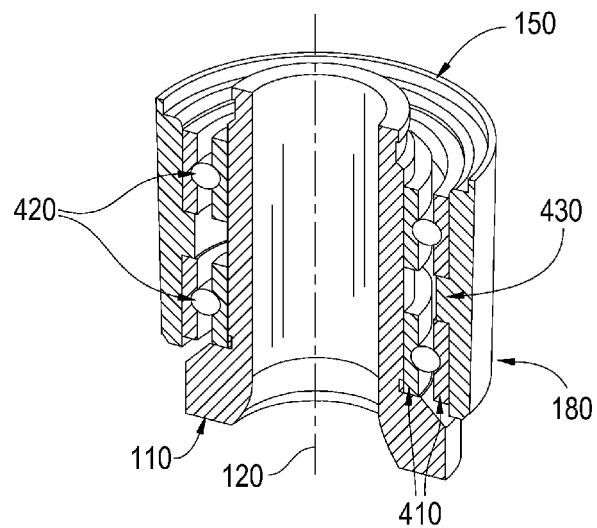
FIG. 12 is a cross-sectional view of a tapered pivot bearing cartridge according to certain embodiments of the invention.

One of ordinary skill in the art will recognize that in any of the foregoing embodiments, the first tapered shim 150 may form an outer housing of the pivot bearing 110 to form a tapered pivot bearing cartridge 180, as shown in FIG. 12. The tapered pivot bearing cartridge may be tapered axially or circumferentially with respect to the pivot bearing rotational axis 120. One of skill in the art further will recognize that in any of the foregoing embodiments, the second tapered shim 140 may form an inner housing of the actuator arm 130 to form a tapered actuator bore 170, as shown in FIG. 11. The tapered actuator bore may be tapered axially or circumferentially with respect to the pivot bearing rotational axis.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

We claim:

1. A disk drive actuator assembly comprising:
   a pivot bearing defining a pivot bearing rotational axis;
   an actuator arm including a bore, the pivot bearing disposed at least partially within the bore;
   a first tapered shim, interposed in the bore between the pivot bearing and the actuator arm, the first tapered shim having a thickness at a first end greater than a thickness at a second end;
   a second tapered shim, interposed in the bore between the pivot bearing and the actuator arm, the second tapered shim having a thickness at a third end greater than a thickness at a fourth end;
   wherein the second tapered shim frictionally engages the first tapered shim to hold the pivot bearing substantially in place relative to the actuator arm.

2. The disk drive actuator assembly of claim 1, wherein the first tapered shim forms an outer housing of the pivot bearing to form a tapered pivot bearing cartridge.

3. The disk drive actuator assembly of claim 1, wherein the second tapered shim forms an inner housing of the actuator arm to form a tapered actuator bore.

4. The disk drive actuator assembly of claim 1, wherein the first tapered shim is substantially cylindrical.

5. The disk drive actuator assembly of claim 4, wherein the first tapered shim is a substantially right circular cylinder.

6. The disk drive actuator assembly of claim 4, wherein the second tapered shim is substantially cylindrical.

7. The disk drive actuator assembly of claim 6, wherein the second tapered shim is a substantially right circular cylinder.

8. The disk drive actuator assembly of claim 1, wherein the first tapered shim is split to form a gap between a first edge that is substantially parallel to the pivot bearing rotational axis, and a second edge that is substantially parallel to the pivot bearing rotational axis.

9. The disk drive actuator assembly of claim 8, wherein the second tapered shim is split to form a gap between a third edge that is substantially parallel to the pivot bearing rotational axis, and a fourth edge that is substantially parallel to the pivot bearing rotational axis.

10. The disk drive actuator assembly of claim 1, wherein the first end is a lower axial extent and the second end is an upper axial extent.

11. The disk drive actuator assembly of claim 10, wherein the third end is an upper axial extent and the fourth end is a lower axial extent.

12. The disk drive actuator assembly of claim 8, wherein the first end is a first circumferential extent that includes the first edge and the second end is a second circumferential extent that includes the second edge.

13. The disk drive actuator assembly of claim 9, wherein the third end is a third circumferential extent that includes the third edge and the fourth end is a fourth circumferential extent that includes the fourth edge.

14. The disk drive actuator assembly of claim 1, wherein the thickness of the first tapered shim varies substantially linearly from the first end to the second end.

15. The disk drive actuator assembly of claim 14, wherein the thickness of the second tapered shim varies substantially linearly from the third end to the fourth end.

16. The disk drive actuator assembly of claim 1, wherein the thickness at the first end is in the range of about 230 microns to about 900 microns.

17. The disk drive actuator assembly of claim 1, wherein the thickness at the third end is in the range of about 230 microns to about 900 microns.

18. The disk drive actuator assembly of claim 1, wherein the thickness at the second end is in the range of about 25 microns to about 180 microns.

19. The disk drive actuator assembly of claim 1, wherein the thickness at the fourth end is in the range about 25 microns to about 180 microns.

20. The disk drive actuator assembly of claim 1, wherein the first tapered shim comprises a first inner surface in frictional contact with at least a portion of the pivot bearing and a first outer surface defining a first taper angle with respect to the first inner surface, wherein the first outer surface is in frictional contact with at least a portion of the second tapered shim.

21. The disk drive actuator assembly of claim 20, wherein the second tapered shim comprises a second outer surface in frictional contact with at least a portion of the bore and a second inner surface defining a second taper angle with respect to the second outer surface, wherein the second inner surface is in frictional contact with at least a portion of the first outer surface of the first tapered shim.

22. The disk drive actuator assembly of claim 21, wherein the first taper angle is substantially equal to the second taper angle.

23. The disk drive actuator assembly of claim 20, wherein the first outer surface includes at least one raised portion for frictionally engaging the second inner surface.

24. A method of fabricating a disk drive actuator assembly, comprising
providing a pivot bearing defining a pivot bearing rotational axis;
providing an actuator arm including a bore;
disposing at least a portion of the pivot bearing within the bore;
inserting at least a portion of a first tapered shim into the bore between the pivot bearing and the actuator arm, the first tapered shim having a thickness at a first end greater than a thickness at a second end; and
inserting at least a portion of a second tapered shim into the bore between the pivot bearing and the actuator arm, the second tapered shim having a thickness at a third end greater than a thickness at a fourth end, such that the second tapered shim frictionally engages the first tapered shim to hold the pivot bearing substantially in place relative to the actuator arm.

25. The method of claim 23, wherein the first tapered shim is split to form a gap between a first edge that is substantially parallel to the pivot bearing rotational axis and a second edge that is substantially parallel to the pivot bearing rotational axis.

26. The method of claim 23, wherein the first end is a lower axial extent and the second end is an upper axial extent.

27. The method of claim 25, wherein inserting at least a portion of a second tapered shim into the bore comprises applying a force on the second tapered shim substantially parallel to the pivot bearing rotational axis.

28. The method of claim 24, wherein the first end is a first circumferential extent that includes the first edge and the second end is a second circumferential extent that includes the second edge.

29. The method of claim 27, wherein inserting at least a portion of a second tapered shim into the bore comprises applying a substantially tangential force to the second tapered shim to frictionally engage the first tapered shim.

30. The method of claim 28, wherein the second tapered shim further comprises a raised tab for applying the substantially tangential force.

31. The method of claim 23, wherein the first tapered shim forms an outer housing of the pivot bearing to form a tapered pivot bearing cartridge.

32. The method of claim 23, wherein the second tapered shim forms an inner housing of the actuator arm to form a tapered actuator bore.

* * * * *